United States Patent [19]
Shercliff

[11] Patent Number: 6,155,835
[45] Date of Patent: Dec. 5, 2000

[54] PROGRAMMABLE APPARATUS

[75] Inventor: Andrew William Shercliff, Swansea, United Kingdom

[73] Assignee: Mumbles Science Adventure Limited, Swansea, United Kingdom

[21] Appl. No.: 09/208,293

[22] Filed: Dec. 9, 1998

[30] Foreign Application Priority Data

Jan. 17, 1998 [GB] United Kingdom .................. 9800941

[51] Int. Cl.⁷ ............................ G09B 19/00; G09B 5/00; G09B 5/04; G09B 25/00; A63H 17/00
[52] U.S. Cl. ........................ 434/118; 434/309; 434/319; 434/393; 446/94; 446/95
[58] Field of Search ................................... 434/118, 130, 434/131, 133, 136, 139, 140, 291, 292, 293, 294, 307 R, 308, 309, 319, 320, 321, 379, 382, 393; 446/85, 88, 90, 94, 95, 272, 232, 236; D21/483, 493, 513, 517; D14/140, 143, 144

[56] References Cited

U.S. PATENT DOCUMENTS

| | | | |
|---|---|---|---|
| D. 260,888 | 9/1981 | Thomas | D14/3 |
| D. 339,340 | 9/1993 | Gobindram | D14/143 |
| 4,548,584 | 10/1985 | Townsend | 434/118 |
| 4,654,659 | 3/1987 | Kubo | 340/825.76 |
| 4,712,184 | 12/1987 | Haugerud | 364/513 |
| 4,919,639 | 4/1990 | Hesse | 446/462 |
| 5,350,033 | 9/1994 | Kraft | 180/167 |
| 5,609,508 | 3/1997 | Wingate | 446/142 |
| 5,697,829 | 12/1997 | Chainani | 446/436 |
| 5,908,345 | 6/1999 | Choi | 446/436 |

FOREIGN PATENT DOCUMENTS

| | | |
|---|---|---|
| 98309998 | of 0000 | European Pat. Off. . |
| WO90/02983 | 3/1990 | WIPO . |

OTHER PUBLICATIONS

Article entitled "Behavior Construction Kits", by Michael Resnick, in Communications of the ACM, Jul. 1993, No. 7.
Leininger, "Heath's Hero–1 Robot", Byte Publications, pp. 86–96, Jan. 1983.

*Primary Examiner*—Kien T. Nguyen
*Assistant Examiner*—John Edmund Rovnak
*Attorney, Agent, or Firm*—David P. Gordon; David S. Jacobson; Thomas A. Gallagher

[57] ABSTRACT

A base unit has a microprocessor onboard and is programmable via a keypad. A drive is operable in accordance with a program input into the microprocessor in order to provide motive power to move the movable element. The base unit may be derived from a telephone unit of conventional type, and have wheels/axles drivable in accordance with the microprossesor program. The base unit may serve as a base for a consructional toy (which may have elements driven by the axles) and functions as an educational aid to introduce basic computer programming.

30 Claims, 2 Drawing Sheets

PROGRAMMABLE APPARATUS

FIELD OF THE INVENTION

The present invention relates to programmable apparatus, and in particular to programmable apparatus which may be used as teaching/learning aid and/or for other facilitating purposes.

SUMMARY OF THE INVENTION

According to the present invention, there is provided apparatus comprising:
i) a base unit having a keypad;
ii) a microprocessor onboard the base unit and programmable via the keypad; and
iii) drive means operable in accordance with the program input into the microprocessor, the drive means providing motive power to move the base unit and/or one or more other moveable elements which may comprise the apparatus.

The drive means is preferably provided onboard the base unit and controllable by the microprocessor.

It is preferred that the base unit comprises a housing. The microprocessor and also preferably the drive means, are preferably provided in the interior in the housing.

In a preferred embodiment, the base unit comprises a telephone unit housing. It is preferred that the drive means comprises one or more electrically operated drive motors. It is preferred that drive means is provided to enable the base unit to be driven over a support surface and also to enable the base unit to drive external mechanical apparatus.

In a first embodiment the drive means may be arranged to drive the base unit over a surface. Desirably, one or more rotatable drive members (such as rollers, wheels or the like) are mounted to the base unit for this purpose. In a preferred embodiment, the base unit is provided with a pair of rotatable drive members (preferably wheels or rollers) mounted one on either side of the base unit.

In an alternative embodiment (or additionally) the drive means may be configured to drive one or more moveable elements provided for the base unit. The apparatus may further comprise formations provided on the base unit for co-operation with complementary formations comprising educational construction elements such as building blocks, elongate strips or the like. For example, use with educational constructional kits that are commercially available under the registered trade marks LEGO, K'NEX or MECCANO is envisaged. The base unit may therefore be used as a base or adjunct for constructing models or the like using such construction kits. The drive means may be used to move selected constructional elements in accordance with a predetermined program dictated by the microprocessor.

In one embodiment, the drive means is arranged to drive one or more axles to which respective base unit support wheels or rollers are mounted. The wheels are preferably demountable from respective axles enabling the relevant axle to be used to drive external mechanical apparatus such as for example gears, pulleys or the like comprising a toy construction arrangement. Alternatively, or additionally, a drive axle may be provided dedicated to driving external mechanical apparatus and not intended to have the dual function of driving the base unit over the support surface. Desirably drive motors (and hence driving axles) are arranged to be operated independently of one another in accordance with the program stored in the microprocessor.

It is preferred that the apparatus further comprises display and/or illumination means (such as an LCD display window or LED's) and/or loud speaker means and/or microphone means each having a respective input or output to the microprocessor. The display is preferably capable of displaying graphics and also text information.

The unit preferably carries means for recording and/or storing audio and/or visual data, and also preferably for play back of the stored audio and visual data.

It is preferred that the apparatus includes a telephone handset, which may, advantageously, be secured in place onboard the telephone unit housing. It is preferred that securing means (such as a clip, clasp or the like), is provided to secure the telephone handset in position.

The audio input into the unit may be provided by the microphone of the telephone system (either via the handset and/or the 'handsfree' microphone on the unit). The audio playback may for example, be facilitated via the handset loudspeaker and/or a 'handsfree' loudspeaker integral in the base unit.

It is preferred that the base unit is provided with one or more digital or analog output sockets, connecting with the microprocessor and arranged to be connected to operate electrical devices such as for example one or more lights, solenoids and/or electrically operated valves.

Desirably the base unit is provided with connection means for digital or analog inputs to the microprocessor; the respective inputs may be connected to input electrical devices such as switches, and/or sensors or the like. It is preferred that the base unit is provided with marking means, such as a pen or other attachment arranged to be mounted for movement with the base unit.

Desirably the base unit is provided with means for connecting the microprocessor to external programming means such as a personal computer (PC).

Preferably, the apparatus includes a memory, (such as an EEPROM) associated with the processor and arranged to store programmed data. Desirably, the memory is provided onboard the base unit, preferably within the telephone housing.

Apparatus features such as switches, drive motors/axles and external connections may be colour coded to match colour coding on the relevant keypad keys which control programming of the relevant apparatus feature.

Desirably, the unit includes a clock capable of displaying 'real time' and or process operational time.

Remote control means is preferably provided enabling remote control or programming of the unit. For example, a hand held keypad may be used to remotely programme the apparatus, or a joystick may be used to control operation of the drive means. The remote control means typically operates via either infra red or radio means.

The invention will now be further described in a specific embodiment by way of example only.

DETAILED DESCRIPTION OF THE PREFERRED EMBODIMENT

Figure 1:
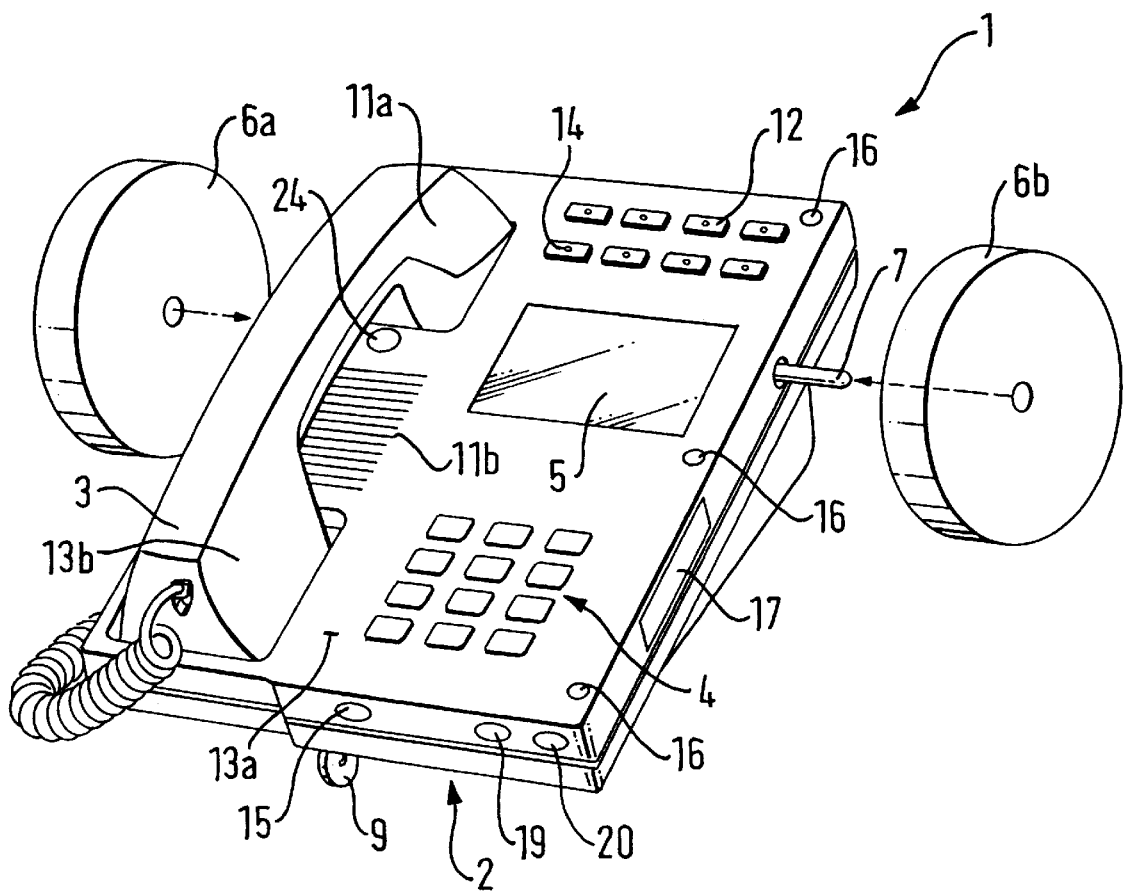
FIG. 1 is a perspective view of apparatus according to the invention.
Figure 2:
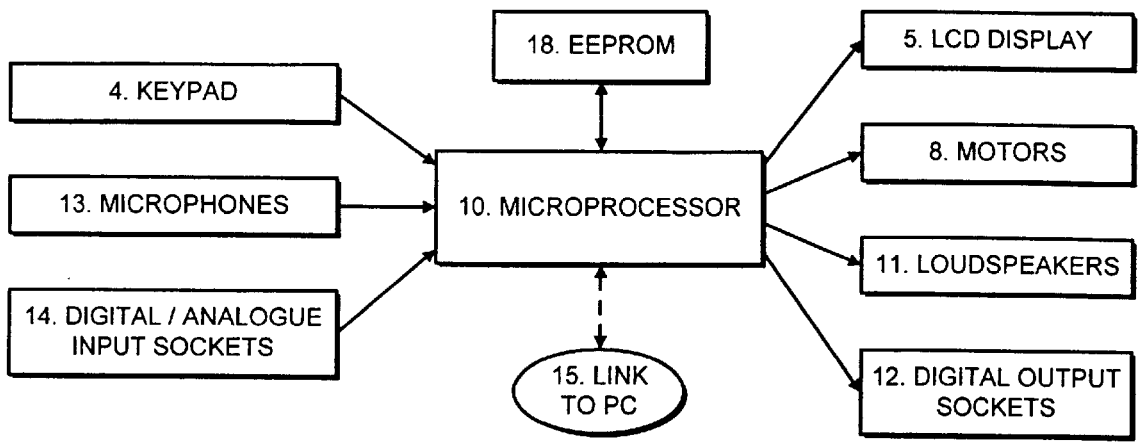
FIG. 2 is a block diagram of the microprocessor and input/output arrangement mounted onboard the base unit.

Referring to FIGS. 1 to 4 of the drawings, the apparatus, generally designated 1, comprises a base unit in the form of a standard digital telephone unit housing 2, provided with handset 3, keypad 4, and LCD display window arrangement 5. An on/off switch 19 is also provided.

A pair of drive wheels 6a/6b are mounted at the forward end of the housing unit 2 and driven by battery powered electric motors 8 provided internally of housing unit 2. A castor 9 is provided toward the rear of the housing (alternatively, a skid may be utilised). Operation of motors 8 to drive wheels 6a/6b causes housing unit 2 to move over the support surface on which the apparatus rests.

Operation of the motors 8 is controlled by a microprocessor 10 provided internally of the telephone unit housing 2. Other outputs of the microprocessor 10 are connected to the LCD output display arrangement 5, telephone loudspeakers 11a, 11b and digital/analog output sockets 12. Keypad 4 is connected to microprocessor 10, enabling the microprocessor to be programmed to produce predetermined output control stimuli to the relevant microprocessor outputs described above. A further microprocessor input is via microphones 13a,13b which can be used to make audio recordings and to trigger voice activated output.

A help switch 24 triggers the production of spoken information via loudspeaker 11a or 11b in order to help the user operate the apparatus. In a preferred embodiment, the help switch is activated when the handset 3 is lifted.

A volume control 20 allows the volume of loudspeakers 11a, 11b to be adjusted.

Digital/analog input sockets 14 may also be provided to enable input to the microprocessor from other external sources, such as for example switches or sensors (e.g. temperature sensors, photoelectric sensors, limit switches and proximity sensors).

LCD display 5 is capable of displaying text and visual images and also includes a selectable clock display. The clock may be used to control programmed functions of the apparatus.

Additionally an input and output facility to microprocessor 10 is provided via a personal computer (PC) link 15 which enables the microprocessor to be programmed via a PC (or programs downloaded from the PC) rather than via keypad 4. The PC link 15 also enables data to be downloaded from the microprocessor 10 to be output via a PC screen display, or stored in the PC memory. Data can also be stored in an EEPROM memory 18 connected to microprocessor 10.

Figure 4:
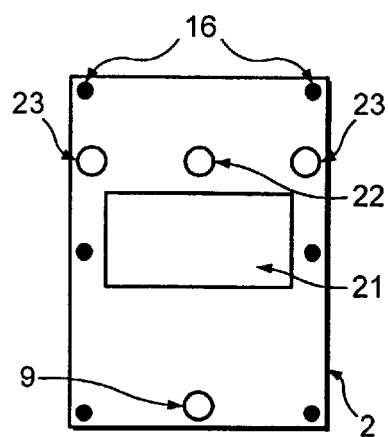

FIG. 4 shows clearly the battery compartment 21 for receiving d.c. batteries (which may be rechargeable) used to conventionally power the apparatus. Alternatively the apparatus may be run from mains electricity via a suitable transformer.

As shown in FIG. 1, an expansion pack slot 17 is provided in the unit housing permitting one of a variety of selected expansion packs to be used to extend the power and functionality of the apparatus. The expansion pack includes its own EEPROM memory which controls program functionality, data, demos and help information necessary to enable the particular expansion pack to operate in 'expansion pack' mode. The data stored on the expansion pack EEPROM could relate to application specific information dependent upon the users interests, needs or other factors (such as for example educational curriculum requirements). Additionally expansion packs could include application specific hardware such as video, telecommunications or radio transmission and/or reception apparatus, depending upon the user requirements.

A pen holder port 22 for receiving a marking pen is shown on the underside of the unit in FIG. 4, as are the supporting feet 23.

The unit 2 can be used to power and control working models made from the leading construction kits such as Lego, K'Nex and Meccano, this would allow working models to be created such as, for example, a robot arm, a mouse which finds its way out of a maze, a set of traffic lights, a mobile crane, a pattern drawing machine, a walking 'thinking' dinosaur. To this end, six vertical fixing tubes 16 are provided in each corner and mid-way along the length of each side. The tubes 16 extend right through to the underside of the unit. The fixing holes are shaped and dimensioned and spaced so as to receive rods/construction elements from one or more proprietary construction kit systems such as the systems mentioned above. To this end also wheels 6a/6b are demountable from the driving motor shafts 7 which shafts are then connectable to provide rotary mechanical drive to the external constructional kit structures and arrangements.

Figure 3:
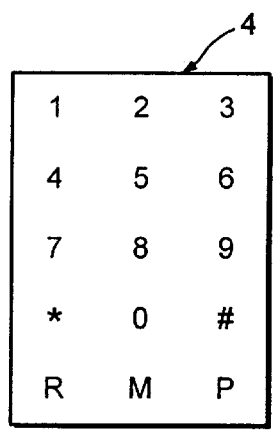
FIG. 3 is a schematic representation of the layout of a keypad for apparatus according to the invention; and, FIG. 4 is an underside view of the apparatus according to the invention

An example of operation of the apparatus described above will now be given in which the microprocessor is programmed by a keypad 4, arrangement as shown in FIG. 3. The relevant numbers and icons shown in FIG. 3 are related as follows:

1 Left motor forward
2 Both motors forward
3 Right motor forward
4 Left motor reverse
5 Both motors reverse
6 Right motor reverse
7 Output 7 on
8 Output 8 on
9 output 9 on
* Pulse
0 Output 0 on
All off
R Start recording
M change mode
P Start playback In its simplest Mode, 'Action Mode', the telephone unit 2 can be driven by single key presses on the telephone keypad 4. Pressing any key for a second time reverses the action (for example turns off the motor or output, or stops recording). Pressing 'All off' (#) switches off all outputs and motors.

The LCD display 5 shows the function of each key as it is pressed; for example 'Output 7 on' is displayed when the 7 key is first pressed. 'Pulsing' an output or motor pulses the current to the output or motor in a regular 'on/off' sequence. This will flash a light connected to a digital output 12, or slow down a motor 8. The output or motor which is pulsed will be the one most recently activated, for example pressing key 7 followed by the pulse key will flash the light or other device attached to output 7.

The ability to 'record' is a similar concept to recording on a cassette recorder or video recorder (or the 'Macro' facility in a wordprocessor). When the 'Record' key (R) is pressed, the following key stroke sequence input is stored as a 'procedure' (including the number of milliseconds each key is in operation), until the 'record' key (R) is pressed again, to stop recording. Pressing the 'Playback' key (P) will operate the apparatus (including the relevant outputs) in accordance with the recorded sequence of keystrokes. A simple example of the use of 'Playback' (P) is to 'program' the telephone unit 2 to travel round the four sides of a square.

Action mode mode is designed for beginners to master the telephone unit 2, and for younger children to learn the concepts of control and of simple programming, via 'Record' and 'Playback'.

The loudspeakers 11a,11b can optionally provide spoken 'help' information to assist a new user to learn how to operate the apparatus.

For more advanced users a further 10 Procedures can be recorded and played back by entering a number key 0–9 immediately following the 'record' (R) or 'playback' (P) key.

Procedures may also be 'triggered' by external events such as switches closing, a sound at or above a predetermined level (or at a predetermined frequency), sensors detecting a change, or a predetermined time of day being reached.

A simple example would be for a Procedure to be triggered at 9 o'clock.

Extra modes of operation are provided in addition to Action Mode, via the Mode key(M). These include:

'Music' Mode, in which the keypad 4 acts as a music keyboard.

'Sound Effects' Mode, in which the keys of the keypad 4 trigger different sound effects.

'Voice' Mode, in which voice or other audio input can be recorded via the microphones 13a,13b and subsequently played back via loudspeakers 11a,11b.

'Demo' Mode, in which demonstration Procedures can be played back.

'Clock' Mode, in which the time of day can be displayed and reset, and a time preset to trigger a Procedure.

'Language' Mode, in which the language used for spoken Help information can be changed.

'Local Programming' Mode, in which Procedures can be displayed line by line as computer programs on the LCD 5. In this Mode Procedures may also be edited via the keypad 4, and new commands entered, such as 'repeat' and 'next'.

The functionality of the various modes is delivered via a Standard Program written for the Microprocessor 10. This standard program (and any data entered by the user such as, for example Procedures and audio recordings) are stored in an EEPROM memory 18 in the telephone unit 2, so that turning off the power to the telephone unit 2 does not lose the main program or the Procedures held as data or the audio recordings.

Some users of the apparatus may not wish to progress beyond Local Programming Mode. However, for those with access to a PC (for example an IBM-compatible running Windows 95) a Remote Programming Mode is available. This mode allows users to create and edit telephone unit 2 Procedures on a PC screen, to test telephone unit 2 Procedures via a simulation on the screen, and even to write programs to replace the microprocessor's 'standard' program.

Remote Programming Mode is activated by connecting the telephone unit 2's output socket to a PC's standard serial or parallel socket. The following PC-based facilities are then available:

a) Procedures already recorded in the telephone unit 2 memory can be 'uploaded' to the PC, displayed on the screen, saved to removable (or remote) data storage media, printed out and the like.
b) Procedures can be entered at the PC, existing procedures edited, and the revised set of Procedures downloaded again to the telephone unit 2 memory.
c) Graphical simulation of the telephone unit 2 on the screen of the PC will enable the Procedures to be tested before they are downloaded. This facility will simplify the process of 'debugging' more complex sets of Procedures.
d) Programs may be developed and downloaded by programmers using the programming language in which the telephone unit 2's microprocessor is itself programmed.
e) Audio recordings entered via the microphones 13a, 13b may be uploaded to the PC and saved.
f) Data logged from switches and sensors 14 may be uploaded, saved and analysed.

The external programming facility enables more complex logic to be written, and the operation of the keys 4 on the telephone unit 2 to be modified if desired. This facility would be of particular interest to more advanced school students or computer programming enthusiasts. It also permits the telephone unit 2 to be permanently reprogrammed to carry out a specific task (for example to operate and control a complex mechanical model).

Once the desired changes to the telephone unit 2's Procedures or internal programming have been made and downloaded, the link 15 to the PC can be removed, and the telephone unit 2 again operated as a stand-alone device.

It can be seen that the potential for the apparatus could be taken beyond the immediate benefits for children. For instance, the telephone unit 2 would make an excellent base for the development of easy-to-use aids for the disabled.

The use of off-the-shelf components for the building of the apparatus 1 leads to a minimisation of costs and ease of construction/assembly.

What is claimed is:

1. Programmable apparatus comprising:
   a) a base unit in the configuration of a telephone unit housing having a keypad;
   b) a microprocessor onboard said base unit and programmable via said keypad;
   c) at least one rotatable support member on which the base unit is supported to be movable; and
   d) drive means operable in accordance with a program input into said microprocessor, said drive means being arranged to drive said at least one rotatable support member on which the base unit is supported to be moveable, the same respective drive means being arranged to be operable to drive an external mechanical arrangement.

2. Apparatus according to claim 1, wherein said drive means is provided onboard said base unit and is controllable by said microprocessor.

3. Apparatus according to claim 1, wherein said microprocessor and said drive means are provided in the interior of said base unit.

4. Apparatus according to claim 1, wherein said drive means comprises one or more electrically operated drive motors.

5. Apparatus according to claim 1, wherein said drive means is arranged to drive the base unit over a surface.

6. Apparatus according to claim 1, wherein said rotatable support members comprise a pair of rotatable drive members mounted one on either side of said base unit.

7. Apparatus according to claim 1, wherein said drive means is configured to drive one or more movable elements provided for said base unit.

8. Apparatus according to claim 1, further comprising formations provided on the base unit for co-operation with complementary formations comprising educational construction elements.

9. Apparatus according to claim 1, further comprising at least one element selected from the group consisting of illumination means, an LCD display window, an LED, loudspeaker means, and microphone means, coupled to said microprocessor.

10. Apparatus according to claim 1, further comprising loudspeaker means coupled to said microprocessor, wherein said microprocessor is programmable to play through said loudspeaker means at least one selected from the group consisting of spoken help information, sound effects, and music.

11. Apparatus according to claim 1, which includes a telephone handset.

12. Apparatus according to claim 11, further comprising securing means for securing said telephone handset in place onboard the base unit housing.

13. Apparatus according to claim 1, further comprising at least one output socket coupled to said microprocessor for coupling said microprocessor to operate an external electrical device.

14. Apparatus according to claim 13, further comprising an element selected from the group consisting of a light, a solenoid, and an electrically operated valve, coupled to said microprocessor via said at least one output socket.

15. Apparatus according to claim 1, further comprising at least one input coupled to the microprocessor for coupling the microprocessor to an external electrical input device.

16. Apparatus according to claim 1, wherein said base unit is provided with marking means mounted for movement with the base unit.

17. Apparatus according to claim 1, wherein said base unit is provided with connection means for connecting the microprocessor to external programming means for programming the microprocessor.

18. Apparatus according to claim 1, further comprising a memory associated with the microprocessor and arranged to store programmed data.

19. Apparatus according to claim 18, further comprising a microphone coupled to said microprocessor, wherein the memory is capable of storing audio recordings via said microphone.

20. Apparatus according to claim 18, wherein said memory is provided onboard said base unit.

21. An apparatus according to claim 1, further comprising means for coupling the drive means to an external mechanical arrangement, wherein the drive means is operable to drive the external mechanical arrangement.

22. An apparatus according to claim 21, wherein the means for coupling comprises means for coupling the drive means to a movable element of a toy constructional kit assembly.

23. An apparatus according to claim 1, wherein the drive means is arranged to be operable to drive an external mechanical arrangement.

24. An apparatus according to claim 23, wherein the rotatable support member is demountable from the drive means thereby enabling the drive means to connect with and drive the external mechanical arrangement.

25. Apparatus according to claim 1, wherein the rotatable support member is demountable from the drive means thereby enabling the drive means to connect with and drive the external mechanical arrangement such as a movable element of a toy constructional kit assembly.

26. Apparatus according to claim 1, wherein the rotatable support element is mounted on an axle the rotatable support member being demountable from the axle thereby enabling the drive axle to connect with and drive the external mechanical arrangement.

27. Programmable apparatus comprising:
   a) a base unit in the configuration of a telephone unit housing having a keypad;
   b) a microprocessor onboard said base unit and programmable via said keypad;
   c) at least one movable element provided on said base unit; and
   d) drive means operable in accordance with a program input into said microprocessor, said drive means being arranged to provide motive power to move said movable element.

28. Apparatus according to claim 27, further comprising:
   e) a telephone handset.

29. Apparatus according to claim 28, further comprising:
   f) securing means for securing said telephone handset in place onboard the base unit housing.

30. Programmable apparatus comprising:
   a) a base unit having a keypad;
   b) a microprocessor onboard said base unit and programmable via said keypad;
   c) at least one rotatable support member on which said base unit is supported to be movable; and
   d) drive means operable in accordance with a program input into said microprocessor, said drive means being arranged to drive said at least one rotatable support member, wherein
      said at least one rotatable support member is dismountable from said drive means thereby enabling said drive means to connect with an external mechanical arrangement, and
      said drive means is adapted to connect to an external mechanical arrangement when said at least one rotatable support member is dismounted from said drive means.

* * * * *